(12) United States Patent
Harada et al.

(10) Patent No.: US 11,271,268 B2
(45) Date of Patent: Mar. 8, 2022

(54) CELL HOLDER

(71) Applicant: HONDA MOTOR CO., LTD., Tokyo (JP)

(72) Inventors: Ushio Harada, Wako (JP); Masahiro Ohta, Wako (JP); Tadashi Tsunoda, Wako (JP); Sokichi Okubo, Wako (JP); Hiroto Maeyama, Wako (JP); Noriaki Kamaya, Wako (JP); Toru Sukigara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 49 days.

(21) Appl. No.: 16/753,074

(22) PCT Filed: Oct. 10, 2017

(86) PCT No.: PCT/JP2017/036646
§ 371 (c)(1),
(2) Date: Apr. 2, 2020

(87) PCT Pub. No.: WO2019/073518
PCT Pub. Date: Apr. 18, 2019

(65) Prior Publication Data
US 2020/0295320 A1    Sep. 17, 2020

(51) Int. Cl.
H01M 50/20    (2021.01)
(52) U.S. Cl.
CPC ................... H01M 50/20 (2021.01)

(58) Field of Classification Search
CPC ..................................... H01M 50/20
See application file for complete search history.

(56) References Cited

FOREIGN PATENT DOCUMENTS

| JP | 2001-167745 A | 6/2001 |
| JP | 2001-236937 A | 8/2001 |
| JP | 2001-296932 A | 10/2001 |
| JP | 2005-011742 A | 1/2005 |
| JP | 2008-218297 A | 9/2008 |
| JP | 2014-175078 A | 9/2014 |
| WO | 2017/047064 A1 | 3/2017 |

*Primary Examiner* — Wyatt P McConnell
(74) *Attorney, Agent, or Firm* — Carrier Blackman & Associates, P.C.; Joseph P. Carrier; Jeffrey T. Gedeon

(57) ABSTRACT

A cell holder (1) for holding a secondary battery cell (9) including a positive electrode active material, a negative electrode active material, and an electrolyte which is disposed between the positive electrode active material and the negative electrode active material and is in contact with both the positive electrode active material and the negative electrode active material, and for outputting power from the secondary battery cell (9), includes a cell holder body (30), and a pressing portion (10) which is supported by the cell holder body (30) and includes a disc spring (11) being in contact with a first end face of the secondary battery cell (9) in a first direction and pressing the first end face of the secondary battery cell (9) in a second direction opposite to the first direction.

3 Claims, 6 Drawing Sheets

CELL HOLDER

TECHNICAL FIELD

The present invention relates to a cell holder. More particularly, it relates to a cell holder for outputting power from an all-solid-state battery cell.

BACKGROUND ART

Conventionally, lithium secondary batteries have been known as high-performance batteries, for example. As for the lithium secondary batteries, all-solid-state batteries using solid electrolytes instead of liquid electrolytes have been developed. As for the all-solid-state batteries, electric resistivity inside a battery cell is reduced by applying pressure to a battery cell including a positive electrode active material, a negative electrode active material, and a solid electrolyte, thereby achieving improvement in battery performance (for example, see Patent Document 1).

Patent Document 1: Japanese Unexamined Patent Application, Publication No. 2001-296932

DISCLOSURE OF THE INVENTION

Problems to be Solved by the Invention

As disclosed in the above publication, in order to reduce the electric resistivity inside the battery cell and improve the battery performance, pressure is applied to the battery cell. However, since the all-solid-state battery is a device which is configured by a contact at an interface between a solid positive electrode active material and a solid electrolyte and a contact at an interface between a solid negative electrode active material and the solid electrolyte, the contact state at the interface is changed due to physical pressurization, and the pressurization state is changed. Further, the pressurization state is changed due to contraction or expansion of the volume due to the charge or discharge reaction of the battery cell. As a result, the battery characteristics fluctuate. It is difficult to finely control the pressure in response to such a change in the pressurization state, and in particular, it is difficult to finely control the pressure in a low pressurized area.

The present invention has been made in view of the above problems, and an object of the present invention is to provide a cell holder that holds an all-solid-state battery cell and can finely set pressure to be applied to the all-solid-state battery cell.

Means for Solving the Problems

In order to achieve the above object, the present invention is characterized in that a cell holder (e.g., the cell holder 1 described later) for holding a secondary battery cell (e.g., the all-solid-state battery cell 9 described later) including a positive electrode active material, a negative electrode active material, and an electrolyte which is disposed between the positive electrode active material and the negative electrode active material and is in contact with both the positive electrode active material and the negative electrode active material, and for outputting power from the secondary battery cell, includes: a cell holder body (e.g., the cell holder body 30 described later); and a pressing portion (e.g., the pressing portion 10 described later) which is supported by the cell holder body and includes a disc spring (e.g., the disc spring 11 described later) being in contact with a first end face (e.g., the lower face 901 described later) of the secondary battery cell in a first direction and pressing the first end face of the secondary battery cell in a second direction opposite to the first direction.

The present invention includes a pressing portion including a disc spring. This makes it possible to finely control the urging force (pressure) by the disc spring, and in particular, to finely control the pressure in a low pressurized area. Therefore, the followability with respect to the volume change of a solid-state battery cell can be enhanced. As a result, it is possible to suppress a change in the contact state of an interface due to a change in the pressurizing state due to the contraction or expansion of the volume due to the charge or discharge reaction of the solid-state battery cell. In other words, it is possible to pressurize so as to become a predetermined pressure by drawing a calibration curve for the displacement of a plurality of disc springs as a whole; thus, it is possible to control the pressure on the solid-state battery cell.

That is, if a volume change occurs in the solid-state battery cell, the disc springs are displaced and follow. Therefore, regardless of the contraction and expansion of the solid-state battery cell, a constant set pressure can be continuously applied to the solid-state battery cell. As a result, predetermined battery characteristics can be obtained from the solid-state battery cell, and the stability of the characteristics of the solid-state battery cell can be enhanced.

As compared with a case using a coiled spring with a spring constant required to provide pressure to the solid-state battery cell, the space for accommodating the disc springs can be reduced when the disc springs are used. This can improve the space efficiency. In addition, it is possible to hold a plurality of solid-state battery cells arranged in a stacked manner by a cell holder 1; thus, it is possible to use a cell holder to hold a module or battery pack of solid-state battery cells. Thus, if a plurality of solid-state battery cells is used in a vehicle, the space inside the vehicle can be effectively utilized. Further, since the cell holder can solve the problem of contraction and expansion of volume due to charge and discharge reactions and can provide stable pressure on the battery cells, it can also be used for a module including liquid-based lithium ion secondary batteries. In this case, the skeleton of the module including the liquid-based lithium ion secondary batteries can be reduced in weight and size.

It is preferable to include a spherical member supported by the cell holder body; and a plate member which is supported by the spherical member so as to be swingable with respect to the cell holder body and is in contact with a second end face opposite to the first end face of the secondary battery cell.

This invention includes the plate member which is supported by the spherical member so as to be swingable with respect to the cell holder body and is in contact with the second end face opposite to the first end face of the solid-state battery cell. This enables the plate member to swing about the center of the spherical member, and can suppress the uneven contact of the plate member to the solid-state battery cell. As a result, the entire first end face of the solid-state battery cell can be stably pressurized; thus, the characteristics of the solid-state battery cell can be stably exhibited. In addition, variations in the performance inside the face of the solid-state battery cell which is in contact with the plate member and the durability of the solid-state battery cell due to the uneven contact of the plate member to the solid-state battery cell can be suppressed.

It is preferable that a recess is formed in the plate member, and a part of the spherical member is fitted into the recess, whereby a part of a surface of the spherical member annularly contacts a portion of the plate member forming the recess and the spherical member supports the plate member.

In this invention, a part of the surface of the spherical member annularly contacts the portion of the plate member forming the recess. This can prevent the spherical member from contacting the plate member at one point to extremely increase the Hertzian contact stress and cause the deformation of the plate member. As a result, the self-aligning function of the spherical member can be prevented from being hindered.

It is preferable that the pressing portion includes a plurality of the disc springs, and the plurality of the disc springs is superposed in a serial combination.

In this invention, the plurality of the disc springs is superposed in a serial combination. As a result, the amount of displacement of each of the disc springs can be reduced with respect to the amount of displacement in the contraction and expansion of the solid-state battery cell; thus, stable pressure followability can be achieved. Further, fine adjustment of the amount of pressure is enabled, and the accuracy of pressurization control can be increased. As a result, the stability of the characteristics of the solid-state battery cell can be enhanced.

Effects of the Invention

According to the present invention, it is possible to provide a cell holder that holds an all-solid-state battery cell and can finely set pressure to be applied to the all-solid-state battery cell.

PREFERRED MODE FOR CARRYING OUT THE INVENTION

Figure 1:
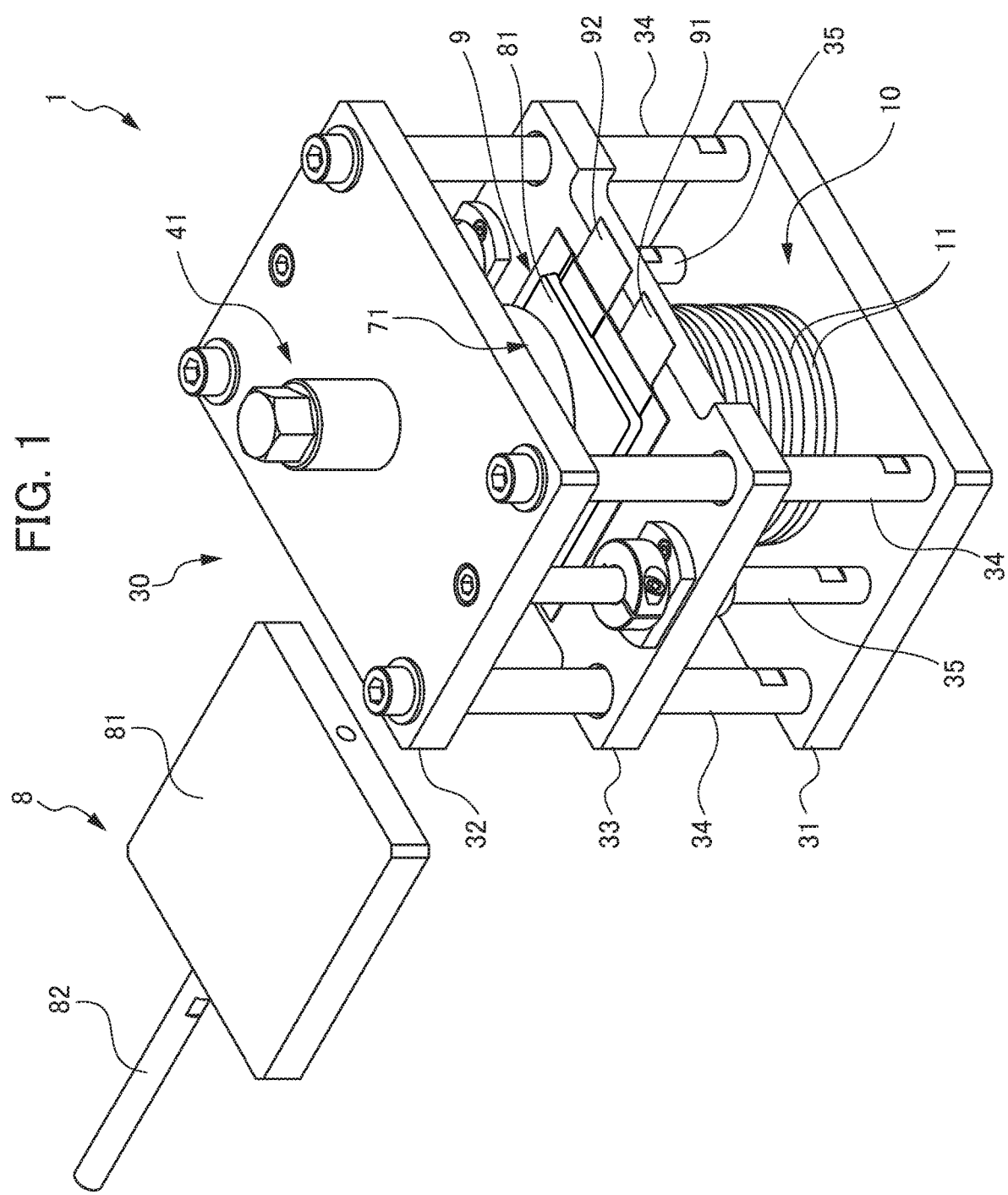
FIG. 1 is a perspective view of a cell holder according to an embodiment of the present invention.
Figure 2:
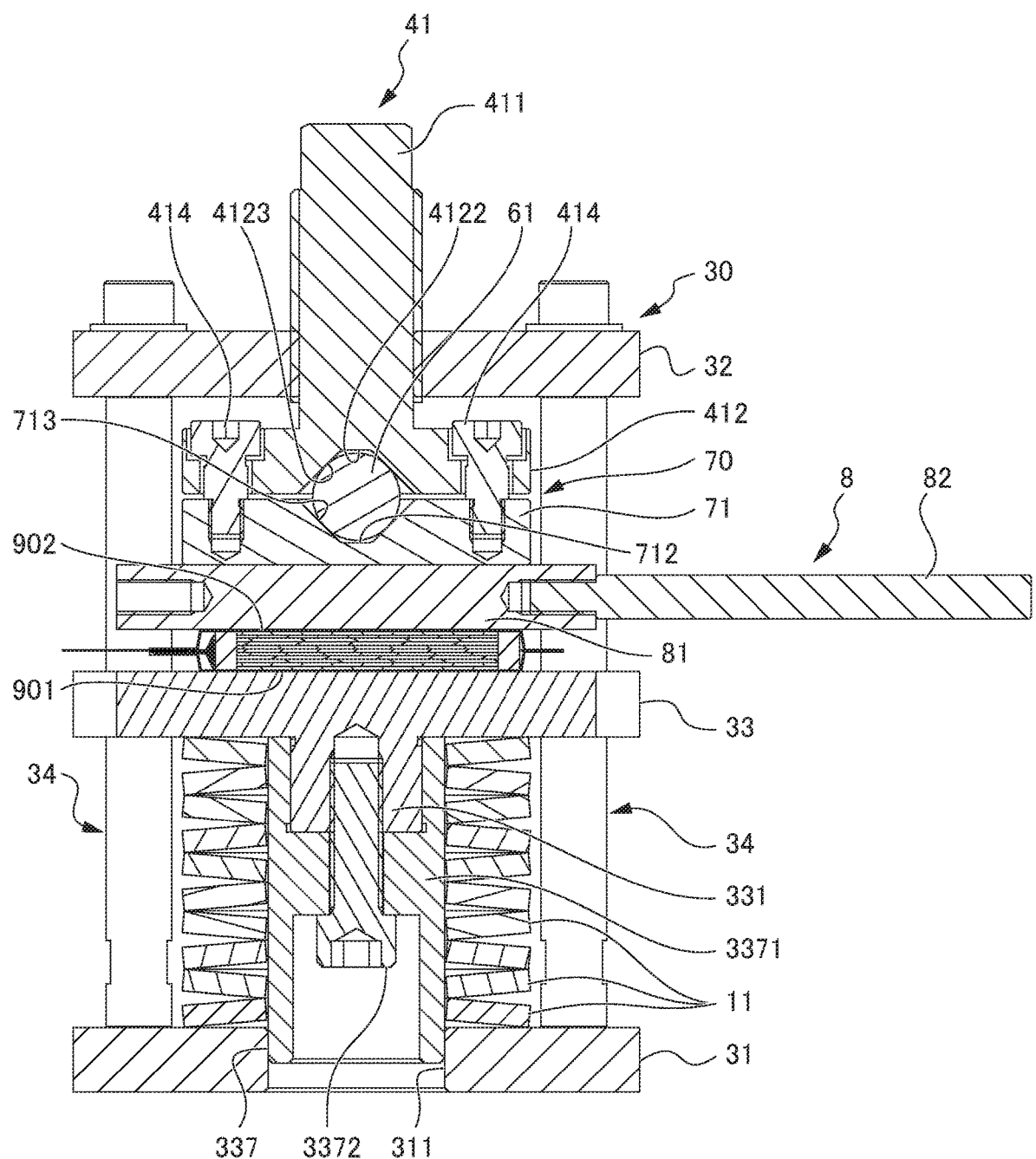
FIG. 2 is a cross-section view of the cell holder according to the above embodiment.

Hereinafter, an embodiment of the present invention will be explained in detail referencing the drawings. FIG. 1 is a perspective view of a cell holder 1 according to the embodiment of the present invention. FIG. 2 is a section-view of the cell holder 1.

The cell holder 1 is a holder for holding an all-solid-state battery cell 9 while applying pressure to the all-solid-state battery cell 9 to output power from the all-solid-state battery cell 9. The cell holder 1 includes a pressing portion 10, a cell holder body 30, a spherical member 61 (see FIG. 2, etc.), and a plate member 70 (see FIG. 2, etc.).

The all-solid-state battery cell 9 as a secondary battery cell, which is held by the cell holder 1 and to which pressure is applied, constitutes an all-solid-state battery. The all-solid-state battery cell 9 includes a positive electrode layer which is constituted by a solid positive electrode active material and functions as a positive electrode and is electrically connected to a positive electrode current collector 91; a negative electrode layer which is constituted by a solid negative electrode active material and functions as a negative electrode and is electrically connected to a negative electrode current collector 92; and a solid electrolyte layer which is disposed between the positive electrode layer and the negative electrode layer. The positive electrode layer, the solid electrolyte layer, and the negative electrode layer are laminated in this sequence. The positive electrode layer is in contact with the solid electrolyte layer, and the negative electrode layer is in contact with the solid electrolyte layer. The entire all-solid-state battery cell 9 is formed in a plate shape and includes a lower face 901 as a first end face having a rectangular shape and an upper face 902 as a second end face having a rectangular shape.

The pressing portion 10 is supported by the cell holder body 30 constituting the outline of the cell holder 1 and includes a plurality of disc springs 11 superposed in a serial combination (serial superposition). The plurality of disc springs 11 is slightly contracted from the free length of the disc springs 11 so as to function as a compressive spring that expands and contracts with a hysteresis of nearly 0 and are arranged between a lower plate 31 and a cell support plate 33 to be mounted on the cell holder body 30. The amount by which the disc springs 11 are contracted is an amount adjusted so that hysteresis becomes nearly zero when pressure is applied to the all-solid-state battery cell 9, as described later. The plurality of disc springs 11 is in contact with the first end face (the lower face 901) of the all-solid-state battery cell 9 in a downward direction as a first direction and press the lower face 901 of the all-solid-state battery cell 9 in an upward direction, which is a second direction opposite to the first direction, through the cell support plate 33 described later.

Figure 3:
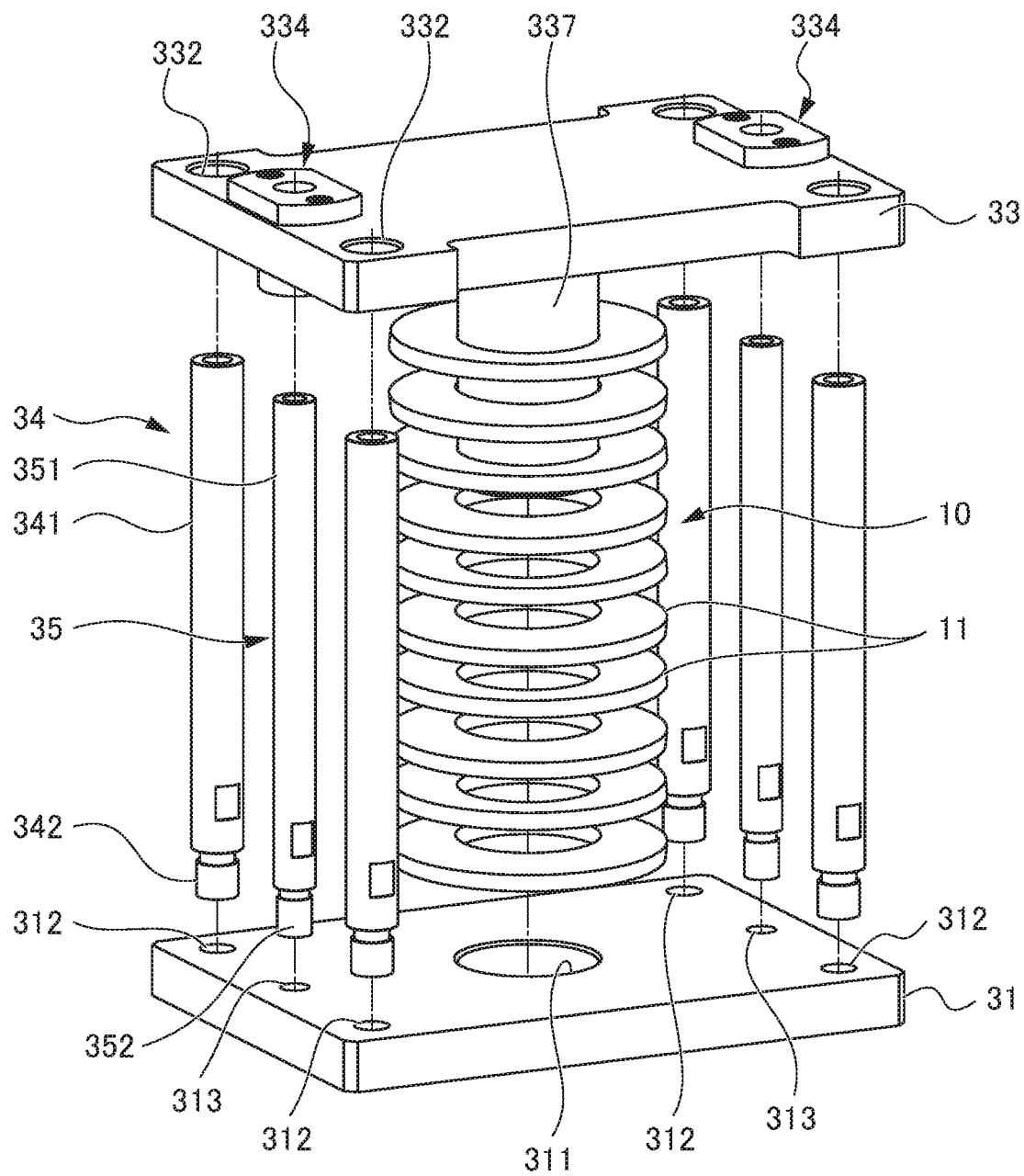
FIG. 3 is an exploded perspective view of the lower part of the cell holder according to the above embodiment.

The cell holder body 30 includes the lower plate 31, an upper plate 32, the cell support plate 33, corner columnar portions 34, and intermediate columnar portions 35. The lower plate 31 has a rectangular plate shape as shown in FIG. 3 and other drawings. A central through hole 311 (see FIG. 2 and other drawings) is formed in the central part of the lower plate 31. In the vicinity of a pair of short sides of the rectangular lower plate 31, edge through holes 312 and intermediate through holes 313 are respectively formed in four corner parts and the middle parts between the respective two corner parts. FIG. 3 is an exploded perspective view of the lower part of the cell holder 1.

The corner columnar portion 34 includes a large diameter portion 341, which is the portion from the upper end part to the vicinity of the lower end part of the corner columnar portion 34, and a small diameter portion 342 constituting the lower end part of the corner columnar portion 34. The portion constituting the connection position between the large diameter portion 341 and the small diameter portion 342 is constricted to be smaller in diameter than the large diameter portion 341. The portion lower than the constricted portion of the corner columnar portion 34 is screwed into the edge through hole 312 of the lower plate 31, and the corner columnar portion 34 is fixed to the lower plate 31.

Similarly, the intermediate columnar portion 35 includes a large diameter portion 351, which is the portion from the upper end part to the vicinity of the lower end part of the intermediate columnar portion 35, and a small diameter portion 352 constituting the lower end part of the intermediate columnar portion 35. The portion constituting the connection position between the large diameter portion 351 and the small diameter portion 352 is constricted to be smaller in diameter than the large diameter portion 351. The portion lower than the constricted portion of the intermediate columnar portion 35 is screwed into the intermediate through hole 313 of the lower plate 31, and the intermediate columnar portion 35 is fixed to the lower plate 31.

Figure 4:
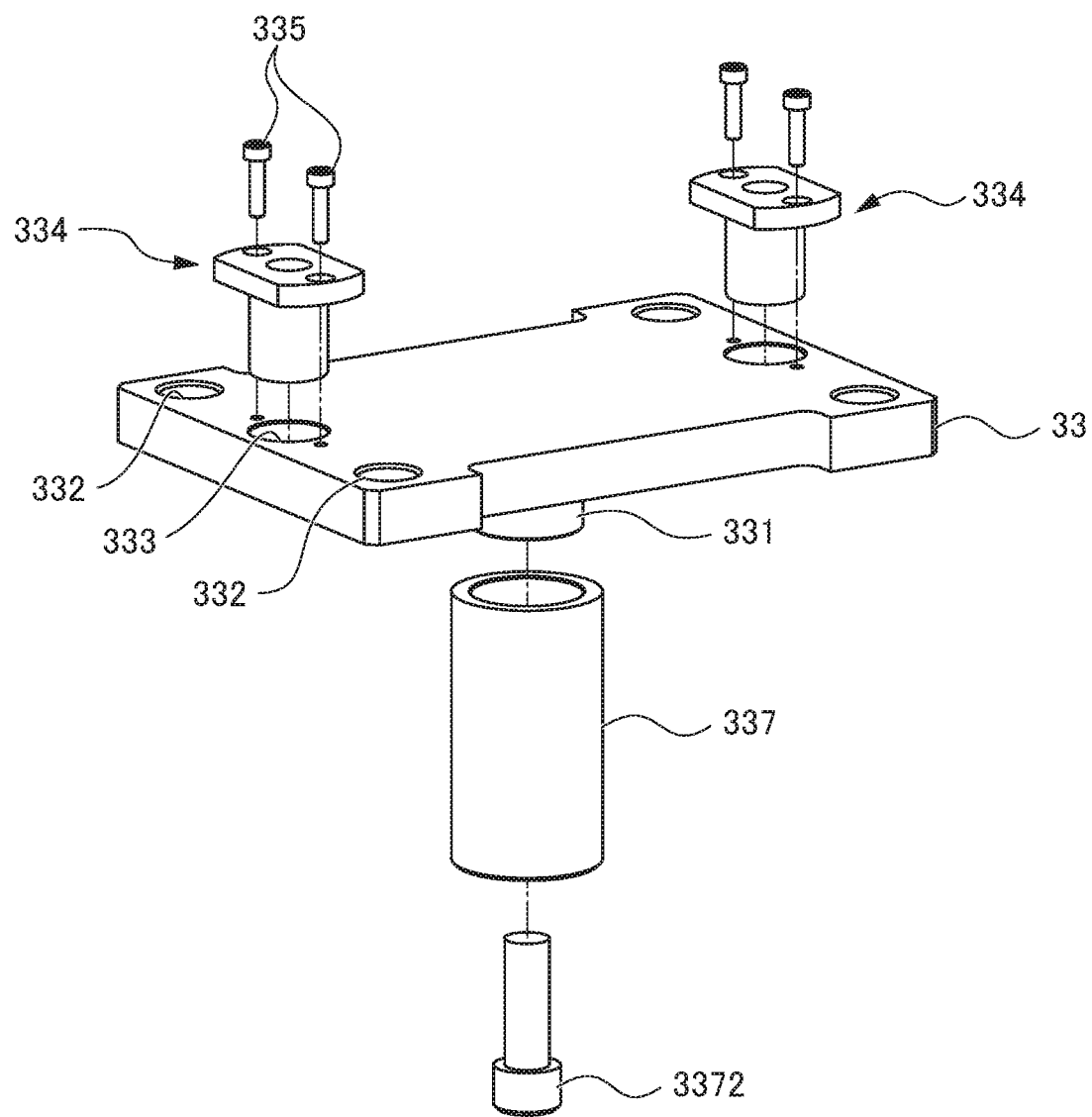
FIG. 4 is an exploded perspective view showing a cell support plate of the cell holder according to the above embodiment.

As shown in FIG. 4 and other drawings, the cell support plate 33 has a substantially rectangular plate shape, and the width of the cell support plate 33 (the width of the cell support plate 33 in a direction connecting a pair of long sides) in the central parts of the pair of long sides is formed to be small. A central cylindrical portion 331 extending in a downward direction is provided in the central part of the lower face of the cell support plate 33. In the vicinity of a pair of short sides of the lower plate 31, support plate edge through holes 332 and support plate intermediate through holes 333 are respectively formed in four corner parts and the middle parts between the respective two corner parts. The large diameter portion 341 of the corner columnar portion 34 penetrates through the support plate edge through hole 332. FIG. 4 is an exploded perspective view showing the cell support plate 33 of the cell holder 1.

Figure 5:
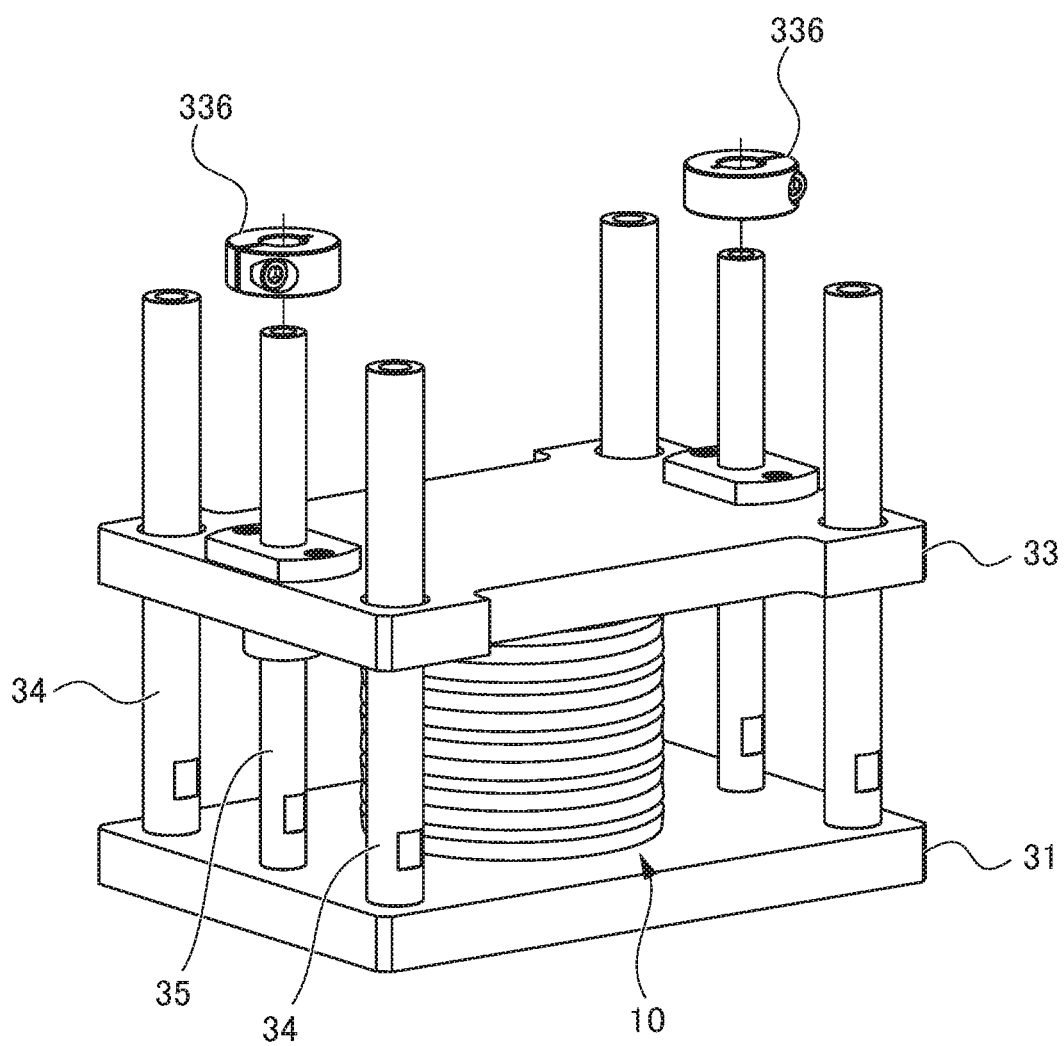
FIG. 5 is a perspective view showing the lower part of the cell holder according to the above embodiment.
Figure 6:
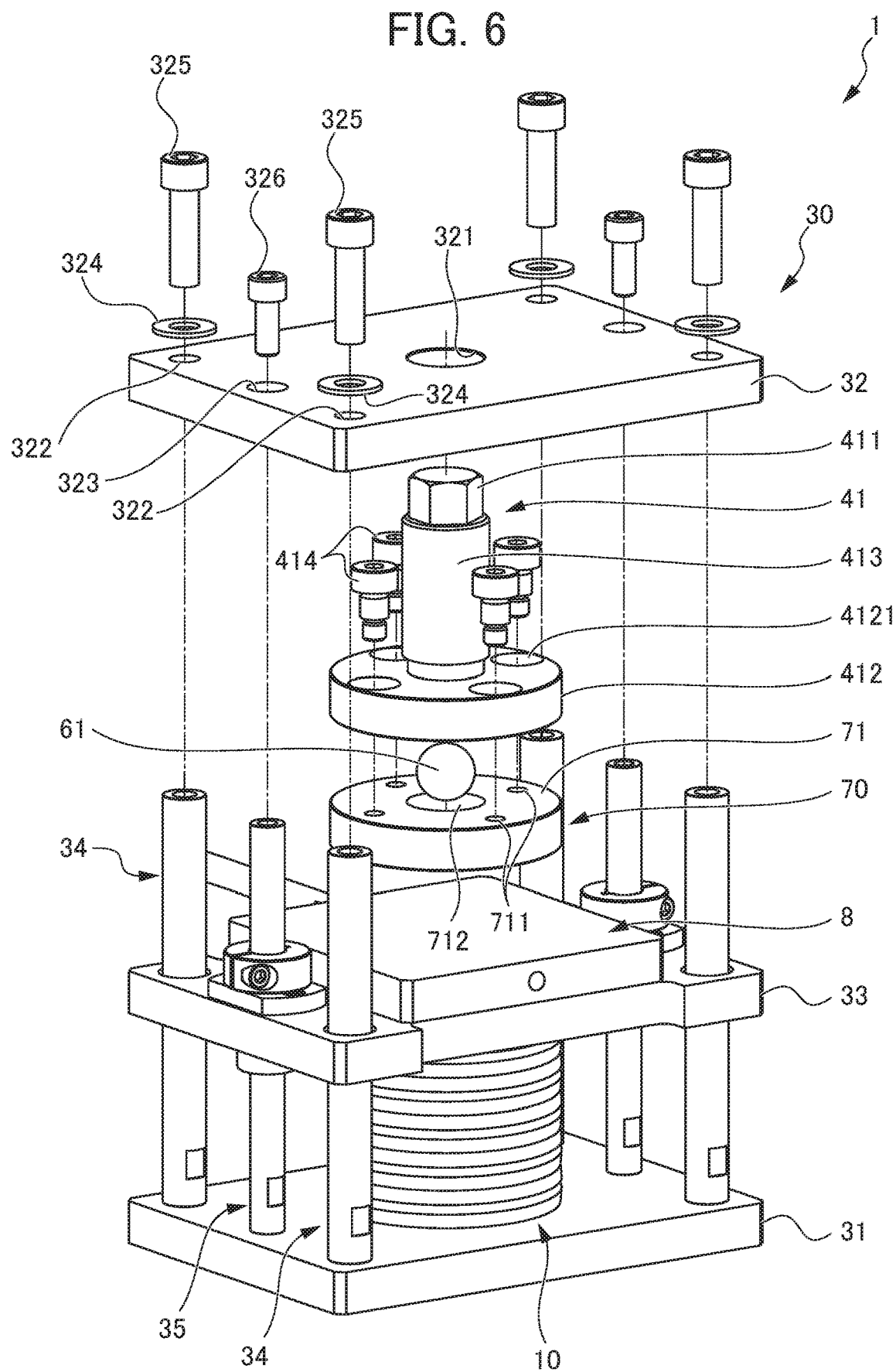
FIG. 6 is an exploded perspective view of the upper part of the cell holder with the lower part of the cell holder according to the above embodiment assembled.

A tubular portion of a linear bush 334 is inserted into the support plate intermediate through hole 333, and an upper flange portion of the linear bush 334 is fixed to an upper face of the cell support plate 33 with a bolt 335. The large diameter portion 351 of the intermediate columnar portion 35 penetrates through the tubular portion of the linear bush 334. As shown in FIGS. 5 and 6, a stopper 336 is provided at a portion of the large diameter portion 351 of the intermediate columnar portion 35 positioned above the upper flange portion of the linear bush 334. The stopper 336 has a cylindrical shape, and the large diameter portion 351 of the intermediate columnar portion 35 penetrates through a central through hole. The stopper 336 is a component for fixing and mounting the disc springs 11 to the cell holder body 30 in a state where the disc springs 11 are slightly contracted from the free length of the disc springs 11. FIG. 5 is a perspective view showing the lower part of the cell holder 1. FIG. 6 is an exploded perspective view of the upper part of the cell holder 1 with the lower part of the cell holder 1 assembled.

The stopper 336 and the linear bush 334 are slidable with respect to the large diameter portion 351 of the intermediate columnar portion 35, and the stopper 336 is fixable to the large diameter portion 351. In the support plate edge through hole 332, a gap is formed between the large diameter portion 341 of the corner columnar portion 34 and the inner peripheral face of the portion of the cell support plate 33 forming the support plate edge through hole 332. As a result, the cell support plate 33 is configured to be vertically movable. The cell support plate 33 is inhibited from tilting by two intermediate columnar portions 35 respectively disposed between two pairs of the corner columnar portions 34, the two pairs giving a total of four corner columnar portions 34. This enables high pressure to stably and uniformly be applied to the entire lower face 901 of the all-solid-state battery cell 9. As a result, the battery characteristics of the all-solid-state battery cell 9 can be stably exhibited.

As shown in FIG. 4, a guide cylindrical member 337 having a cylindrical shape is connected to the central cylindrical portion 331 of the cell support plate 33. More specifically, the central cylindrical portion 331 is inserted into and connected to the guide cylindrical member 337 so that the guide cylindrical member 337 surrounds and covers the outer peripheral face of the central cylindrical portion 331 of the cell support plate 33. As shown in FIG. 2, the inner space of the guide cylindrical member 337 is divided into two portions by a middle plug portion 3371 in the axial central part of the guide cylindrical member 337. A bolt 3372 penetrates through a through hole formed in the center of the middle plug portion 3371, and the bolt 3372 is screwed with the inner peripheral face of the central cylindrical portion 331, whereby the guide cylindrical member 337 is fixed to the central cylindrical portion 331 of the cell support plate 33.

As shown in FIG. 6 and other drawings, the upper plate 32 has a rectangular plate shape. An upper plate central through hole 321 is formed in the central part of the upper plate 32. In the vicinity of a pair of short sides of the rectangular the lower plate 31, upper plate edge through holes 322 and upper plate intermediate through holes 323 are respectively formed in four corner parts and two middle parts between respective two corner parts.

A bolt 325 is inserted into the upper plate edge through hole 322 through a flat washer 324, and the lower end part of the bolt 325 is screwed with the upper end part of the corner columnar portion 34. A bolt 326 is inserted into the upper plate intermediate through hole 323, and the lower end part of the bolt 326 is screwed with the upper end part of the intermediate columnar portion 35. Thus, the upper plate 32 is fixed to the upper end part of the corner columnar portion 34 and the upper end part of the intermediate columnar portion 35.

The shaft portion of the rotation shaft member constituted by a rotating portion 41 is inserted into the upper plate central through hole 321. Specifically, as shown in FIG. 6, the upper end part of the shaft portion of the rotating portion 41 includes a hexagonal head 411, and the lower end part of the shaft portion includes a disk-shaped flange portion 412. An external thread is formed on the peripheral face of an intermediate portion 413 between the upper end part and the lower end part. This external thread is screwed with an internal thread formed on the inner peripheral face of the upper plate 32 on which the upper plate intermediate through holes 323 is formed. The rotating portion 41 is configured to move up and down with respect to the upper plate 32 by rotating the hexagonal head 411.

Four through holes 4121 are formed in the flange portion 412 of the rotating portion 41 at equal intervals in the circumferential direction of the flange portion 412, and bolts 414 penetrate through the through holes 4121 from above. A gap is formed between the portion of the flange portion 412 forming the through hole 4121 and the bolt 414. A recess 4122 recessed upward is formed in the central part of the lower face of the flange portion 412. The recess 4122 is open in a downward direction in a circular shape, and the portion of the flange portion 412 forming the opening constitutes an upper opening periphery.

The plate member 70 is provided below the flange portion 412 and in a position facing the flange portion 412. The plate member 70 includes a plate member body 71 having a disk shape. As shown in FIG. 6, four through holes 711 are formed in the plate member body 71 at equal intervals in the circumferential direction of the plate member body 71. The lower end parts of the bolts 414 are inserted into the through holes 711 from above and fixed to the plate member body 71. A recess 712 recessed downward is formed in the central part of the upper face of the plate member body 71. The recess 712 is open in an upward direction in a circular shape, and the portion of the plate member body 71 forming the opening constitutes a lower opening periphery.

As shown in FIG. 2, the spherical member 61 is fitted into the recess 4122 of the flange portion 412 of the rotating portion 41 and the recess 712 of the plate member body 71. The upper half of the spherical member 61 fits into the recess 4122 of the flange portion 412 of the rotating portion 41, whereby the spherical member 61 is supported by the cell holder body 30 through the rotating portion 41. The lower half of the spherical member 61 is fitted into the recess 712 of the plate member body 71. By having the spherical member 61 fitted in this manner, a part of the surface of the upper hemisphere of the spherical member 61 annularly contacts the inner face of a portion 4123 of the flange portion 412 forming the recess 4122, and a part of the surface of the lower hemisphere of the spherical member 61 annularly contacts the inner face of a portion 713 of the plate member body 71 forming the recess 712.

With this contact and the configuration in which a gap is formed between the portion of the flange portion 412 forming the through hole 4121 of the flange portion 412 of the rotating portion 41 and the bolt 414, and the lower end part of the bolt 414 is inserted into the through hole 711 of the plate member body 71 from above and fixed to the plate member body 71, as described above, the plate member 70 can swing about the center of the spherical member 61 with respect to the cell holder body 30. In other words, the spherical member 61 swingably supports the plate member 70.

The lower face of the plate member 70 presses the all-solid-state battery cell 9 through the upper plate 8. Specifically, the upper plate 8 includes an upper plate body 81 in a rectangular plate shape and a rod member 82 connected to the central part of a side of the upper plate body 81. As described later, the plate member 70 presses the all-solid-state battery cell 9 in a downward direction in a state where the lower face of the plate member 70 is in contact with the upper face of the upper plate body 81 and the lower face of the upper plate body 81 is in contact with the upper face 902 of the all-solid-state battery cell 9. The upper plate 8 prevents the all-solid-state battery cell 9 from being directly subjected to friction from the plate member body 71 when pressed by rotation of the rotating portion 41. The rod member 82 is detachable from the upper plate body 81 and constitutes a grip used when the all-solid-state battery cell 9 is set in a predetermined position of the cell support plate 33.

Next, a description will be given of a procedure of holding the all-solid-state battery cell 9 in the cell holder 1. Firstly, the all-solid-state battery cell 9 is placed on the upper face of the cell support plate 33 so that the lower face 901 of the all-solid-state battery cell 9 is in contact with the upper face of the cell support plate 33. Next, the rotating portion 41, the spherical member 61, and the plate member 70 are moved in a downward direction by rotating the hexagonal head 411 of the rotating portion 41 (see FIG. 6). Then, as shown in FIG. 2, the plate member body 71 of the plate member 70 is in contact with the upper face of the upper plate 8, the lower face of the upper plate 8 is in contact with the upper face 902 of the all-solid-state battery cell 9, and further the plate member 70 presses, whereby the plate member 70 swings and the plate member body 71 contacts the upper face 902 of the all-solid-state battery cell 9 in the widest area so that the plate member body 71 follows the upper face 902 of the all-solid-state battery cell 9. In this state, by further rotating the hexagonal head 411 of the rotating portion 41 by a predetermined quantity, pressure is vertically applied to the all-solid-state battery cell 9 to make the contact states of the interface between the solid positive electrode active material and the solid electrolyte and the interface between the solid negative electrode active material and the solid electrolyte appropriate.

At this time, since the plurality of disc springs 11 is superposed in a serial combination, the disc springs 11 are configured so that the change of the urging force of the springs becomes small with respect to the rotation quantity of the hexagonal head 411 of the rotating portion 41. As a result, the pressure applied to the all-solid-state battery cell 9 by the urging force of the springs is finely controlled, and appropriate pressure is applied to the all-solid-state battery cell 9.

Further, at this time, as described above, a part of the surface of the upper hemisphere of the spherical member 61 annularly contacts the inner face of the portion of the flange portion 412 forming the recess 4122, and a part of the surface of the lower hemisphere of the spherical member 61 annularly contacts the inner face of the portion of the plate member body 71 forming the recess 712. Therefore, it is avoided that the spherical member 61 makes point contact with the flange portion 412 and the plate member body 71 and force is concentrated on the flange portion 412 and the plate member body 71 at a point.

According to the present embodiment, the following advantageous effects are achieved. In the present embodiment, the cell holder 1 for holding the all-solid-state battery cell 9 including a positive electrode active material, a negative electrode active material, and a solid electrolyte which is disposed between the positive electrode active material and the negative electrode active material and is in contact with both the positive electrode active material and the negative electrode active material, and for outputting power from the all-solid-state battery cell 9, includes the cell holder body 30, and the pressing portion 10 which is supported by the cell holder body 30 and includes the disc springs 11 being in contact with the lower face 901 of the all-solid-state battery cell 9 and pressing the lower face 901 of the all-solid-state battery cell 9 in an upward direction.

As a result, the urging force (pressure) of the disc springs 11 can be finely controlled with the structure using the disc springs 11, and in particular, the pressure can be finely controlled in a low pressurized area. Therefore, the followability with respect to the volume change of the all-solid-state battery cell 9 can be enhanced. As a result, it is possible to suppress a change in the contact state of the interface due to a change in the pressurizing state due to the contraction or expansion of the volume due to the charge or discharge reaction of the all-solid-state battery cell 9. In other words, it is possible to pressurize so as to become a predetermined pressure by drawing a calibration curve for the displacements of the plurality of disc springs 11 as a whole (changes in the shortest distance between the lower plate 31 and the cell support plate 33); thus, it is possible to control the pressure on the all-solid-state battery cell 9.

That is, when a volume change occurs in the all-solid-state battery cell 9, the disc springs 11 are displaced and follow. Therefore, regardless of the contraction and expansion of the all-solid-state battery cell 9, a constant set pressure can be continuously applied to the all-solid-state battery cell 9. As a result, predetermined battery characteristics can be obtained from the all-solid-state battery cell 9, and the stability of the characteristics of the all-solid-state battery cell 9 can be enhanced.

As compared with a case using a coiled spring with a spring constant required to provide pressure to the all-solid-state battery cell 9, the space for accommodating the disc springs 11 can be reduced when the disc springs 11 are used.

This can improve the space efficiency. In addition, it is possible to hold a plurality of all-solid-state battery cells 9 arranged in a stacked manner by one cell holder 1 in the present embodiment; therefore, it is possible to use one cell holder 1 in the present embodiment to hold a module or battery pack of the all-solid-state battery cells 9. Thus, if the plurality of all-solid-state battery cells 9 is used in a vehicle, the space inside the vehicle can be effectively utilized. Further, since the cell holder 1 in the present embodiment can solve the problem of contraction and expansion of volume due to charge and discharge reactions and can provide stable pressure on battery cells, it can also be used for a module including liquid-based lithium ion secondary batteries including liquid electrolytes. In this case, the skeleton of the module including the liquid-based lithium ion secondary batteries can be reduced in weight and size.

Further, the cell holder 1 includes the spherical member 61 supported by the cell holder body 30 and the plate member 70 which is supported by the spherical member 61 so as to be swingable with respect to the cell holder body 30 and is in contact with the upper end face of the all-solid-state battery cell 9.

This enables the plate member 70 to swing about the center of the spherical member 61, and can suppress the uneven contact of the plate member 70 to the all-solid-state battery cell 9 through the upper plate body 81. As a result, the entire upper face 902 of the all-solid-state battery cell 9 can be stably pressurized; thus, the characteristics of the all-solid-state battery cell 9 can be stably exhibited. In addition, variations in the performance inside the upper face 902 and the durability of the all-solid-state battery cell 9 due to the uneven contact of the plate member 70 to the all-solid-state battery cell 9 can be suppressed.

In addition, the recess 712 is formed in the plate member 70, and a part of the spherical member 61 is fitted into the recess 712, whereby a part of the surface of the spherical member 61 annularly contacts the portion 713 of the plate member 70 forming the recess 712 and the spherical member 61 supports the plate member 70.

This can prevent the spherical member 61 from contacting the plate member 70 at one point to extremely increase the Hertzian contact stress and cause buckling (deformation of the plate member 70). As a result, the self-aligning function of the spherical member 61 can be prevented from being hindered.

The pressing portion 10 includes the plurality of disc springs 11, and the plurality of disc springs 11 is superposed in a serial combination.

As a result, the amount of displacement of each of the disc springs can be reduced with respect to the amount of displacement in the contraction and expansion of the all-solid-state battery cell 9; thus, stable pressure followability can be achieved. Further, fine adjustment of the amount of pressure is enabled, and the accuracy of pressurization control can be increased. As a result, the stability of the characteristics of the all-solid-state battery cell 9 can be enhanced.

It should be noted that the present invention is not limited to the above-described embodiment and encompasses variations, improvements, and the like within a range in which the object of the present invention is achieved. In the above embodiment, the spherical member 61 and the plate member 70 are provided, but they may not be provided. Similarly, the number of the disc springs 11 is not limited to the number of the present embodiment. For example, if the all-solid-state battery cell 9 held by the cell holder 1 is used in a vehicle, a smaller size is preferable in view of the space inside the vehicle. In such a case, the number of the disc springs 11 may be set to a small number such as one, and the size of the cell holder 1 in the vertical direction may be reduced as a constitution not including the spherical member 61 and the plate member 70. Moreover, as a constitution not including the spherical member 61 and the plate member 70, the disc springs 11 may also be disposed above the all-solid-state battery cell 9, and the pressure of the disc springs 11 may be applied to the all-solid-state battery cell 9 from above and below. In addition, the disc springs 11 are not limited to being used in a serial combination (serial superposition), and may be used in a parallel combination (parallel superposition), for example.

In the present embodiment, the cell holder 1 holds the all-solid-state battery cell 9, but it is not limited to the all-solid-state battery cell 9. For example, the cell holder 1 may hold a liquid-based lithium ion secondary battery or may hold a plurality of all-solid-state battery cells 9 or the like.

The all-solid-state battery cell is configured by the all-solid-state battery cell 9 having a configuration in which a positive electrode layer, a solid electrolyte layer, and a negative electrode layer are stacked in this sequence, but it is not limited to the configuration in which the layers are stacked in this manner.

EXPLANATION OF REFERENCE NUMERALS

1 . . . Cell holder
9 . . . All-solid-state battery cell
10 . . . Pressing portion
11 . . . Disc spring
30 . . . Cell holder body
61 . . . Spherical member
70 . . . Plate member
712 . . . Recess
713 . . . Portion
901 . . . Lower face (first end face)
902 . . . Upper face (second end face)

The invention claimed is:

1. A cell holder for holding a secondary battery cell comprising a positive electrode active material, a negative electrode active material, and an electrolyte which is disposed between the positive electrode active material and the negative electrode active material and is in contact with both the positive electrode active material and the negative electrode active material, and for outputting power from the secondary battery cell, the cell holder comprising:
a cell holder body;
a pressing portion which is supported by the cell holder body and includes a disc spring being in contact with a first end face of the secondary battery cell in a first direction and pressing the first end face of the secondary battery cell in a second direction opposite to the first direction;
a spherical member supported by the cell holder body;
and a plate member which is supported by the spherical member so as to be swingable with respect to the cell holder body and is in contact with a second end face opposite to the first end face of the secondary battery cell.

2. The cell holder according to claim 1, wherein
a recess is formed in the plate member, and
a part of the spherical member is fitted into the recess, whereby a part of a surface of the spherical member annularly contacts a portion of the plate member forming the recess and the spherical member supports the plate member.

3. The cell holder according to claim 1, wherein the pressing portion includes a plurality of the disc springs, and the plurality of the disc springs is superposed in a serial combination.

* * * * *